United States Patent
Zocher et al.

(10) Patent No.: US 8,948,611 B1
(45) Date of Patent: Feb. 3, 2015

(54) I/R RECEIVER WITH DUTY CYCLE SYNCHRONIZED POWER REDUCTION

(75) Inventors: Andrew Gerald Zocher, Monticello, IL (US); Richard Dean Davis, Champaign, IL (US); Theron Lee Jones, White Heath, IL (US); Luiz Antonio Razera, Jr., Scotts Valley, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 292 days.

(21) Appl. No.: 13/485,906

(22) Filed: May 31, 2012

(51) Int. Cl.
*H04B 10/06* (2006.01)

(52) U.S. Cl.
USPC .......................... 398/202; 398/107; 398/110

(58) Field of Classification Search
USPC .......................................... 398/107, 110, 202
See application file for complete search history.

(56) References Cited

U.S. PATENT DOCUMENTS

| 4,807,031 A * | 2/1989 | Broughton et al. ........... 348/460 |
| 2010/0309535 A1 * | 12/2010 | Landowski et al. ........... 359/107 |
| 2013/0033587 A1 * | 2/2013 | Kase et al. ..................... 348/55 |
| 2013/0089335 A1 * | 4/2013 | Gorny et al. .................. 398/106 |

* cited by examiner

*Primary Examiner* — Dzung Tran
(74) *Attorney, Agent, or Firm* — TIPS Group

(57) ABSTRACT

A circuit and method for reducing power consumption in an I/R receiver system includes determining a duty cycle of a command cycle comprising a series of command pulses separated by nulls and enabling and disabling selective active components of an I/R receiver system in accordance with the duty cycle. In an embodiment, the enabling of the active components commences during a null prior to the arrival of a new command pulse. In a further example embodiment, the enabling includes first enabling a first set of active components having a first settling time, waiting for at least the first settling time, and then second enabling a second set of active components having a second settling time.

8 Claims, 3 Drawing Sheets

I/R RECEIVER WITH DUTY CYCLE SYNCHRONIZED POWER REDUCTION

CROSS REFERENCE TO RELATED APPLICATION(S)

This application is related to U.S. Ser. No. 13/485,888, filed May 31, 2012, entitled "Circuits for Active Eyewear", which is incorporated herein by reference.

BACKGROUND

Active eyewear (sometimes referred to as 3D active eyewear, liquid crystal shutter (LCS) glasses, etc.) is eyewear used in conjunction with a display screen (e.g. of a television or computer monitor) to create the illusion of a three dimension image. The right and left lenses of active eyewear are controlled separately to alternate between being transparent ("open") and dark ("closed"). With LCS glasses, each lens includes a liquid crystal layer ("shutter") that is normally transparent but which becomes dark when a voltage from a shutter switching signal is applied.

Active eyewear can be controlled to alternately darken lenses in synchronization with the frame refresh rate of a screen which alternates between frame images taken from different perspectives. This technique is referred to as alternate-frame sequencing, which achieves the desired stereoscopic effect by having each eye see only the image that was intended for it. The synchronization between the active eyewear and the display screen is often achieved wirelessly, e.g. via infrared (I/R) transmission from an I/R transmitter associated with the display screen to an I/R receiver of the active eyewear.

FIG. 1 illustrates an alternate-frame sequencing system 10 in accordance with the prior art. A display screen 12, such as of a 3D television set (3D-TV) 14, has an I/R transmitter 16 which transmits an I/R synchronization signal 18 in response to a SYNC signal generated by the 3D-TV. Active eyewear 20, having a left lens 22 and a right lens 24, is provided with one or more I/R photodiodes 26 that are sensitive to I/R synchronization signal 18. The photodiodes 26 are also sensitive to I/R interference 28 created by, for example, sunlight 30, incandescent light 32 and fluorescent light 34.

FIG. 2 illustrates an example I/R synchronization signal of the prior art. In this example, the I/R synchronization signal includes a series of encoded commands (sometimes referred to as "command pulses") such as OPEN LEFT, CLOSE LEFT, OPEN RIGHT, CLOSE RIGHT, referring to the opening and closing of the left and right lenses, respectively, of the active eyewear 20. These commands are generally modulated to provide one or more pulses within a command pulse which encode the commands, e.g. the OPEN LEFT command 36 could include one pulse, the CLOSE LEFT command 38 could include two pulses, OPEN RIGHT command 40 could include three pulses, and the CLOSE RIGHT command 42 could include four pulses. By way of example, the pulse width of the base band signal may be a few hundred microseconds, and it may be chopped with a square wave carrier having a chop rate that is, for example, about an order of magnitude less.

Historically, there has not been a generally accepted standard format for I/R synchronization signals 18. Therefore, while the I/R synchronization signal of FIG. 2 can be used to generically describe I/R synchronization signals of the prior art, it will be appreciated that different manufacturers may have differ timing between commands, send commands at different rates, or may encode the commands differently.

Recently, there has been some movement towards standardization, such as the Full HD 3D Glasses Initiative, which maintains a website at www.fullhd3dglasses.com. However, even if the industry does standardize over time, there is the problem of legacy equipment that does not conform to the new standards.

Typically, the active eyewear circuitry including an I/R receiver for receiving and decoding the I/R synchronization signal and for controlling the lenses 22 and 24 is provided in the frame of the active eyewear 20. Also provided in the frame would be the one or more I/R photodiodes 26, a power supply (e.g. batteries), and perhaps an on/off switch.

It should be noted that the illustration of FIG. 2 is not to scale. For example, the duty cycle of the commands is generally 10% or less than the command cycle. With this example it is clear that having an I/R receiver on all of the time when it is only needed a small fraction of the time to receive command pulses is wasteful of battery power. However, the prior art has not addressed this problem due to the difficulty of enabling and disabling an FR receiver in such a manner that command pulses are not lost.

High power consumption by the active eyewear circuitry is problematical in that the circuitry is typically powered by small batteries provided in the frames of the active eyewear 20 and a high rate of power consumption will reduce the amount of time that the active eyewear 20 can be used before the batteries need to be recharged or replaced. Therefore, the problem of high power consumption by the I/R receiver is significant in this and other battery-powered applications.

These and other limitations of the prior art will become apparent to those of skill in the art upon a reading of the following descriptions and a study of the several figures of the drawing.

SUMMARY

In an embodiment, set forth by way of example and not limitation, an I/R receiver with duty cycle synchronized power reduction includes an I/R receiver having a number of active components and a controller. The I/R receiver is provided with an analog input receptive to a modulated carrier signal includes a series of command cycles, where each command cycle includes a number of command pulses separated by nulls, where the ratio of the temporal lengths of the command pulses to the temporal length of the command cycle comprises a duty cycle. In this example, the I/R receiver is further provided with a serial digital output for a series of commands derived from the command pulses to the controller which is operative to enable and disable selected active components of the I/R receiver in accordance with the duty cycle to reduce power consumption of the I/R receiver.

In an embodiment, set forth by way of example and not limitation, a method for reducing power consumption in an I/R receiver system includes determining a duty cycle of a command cycle comprising a series of command pulses separated by nulls and enabling and disabling selective active components of an I/R receiver system in accordance with the duty cycle. In an embodiment, the enabling of the active components commences during a null prior to the arrival of a new command pulse. In a further example embodiment, the enabling includes first enabling a first set of active components having a first settling time, waiting for at least the first settling time, and then second enabling a second set of active components having a second settling time.

An advantage of certain example embodiments is that an I/R receiver is at least partially powered down when it is not needed, reducing the power consumed by the I/R receiver over time. Another advantage of certain example embodiments is that an operation of an I/R receiver is synchronized with a known duty cycle of an incoming signal for greater energy efficiency.

These and other embodiments, features and advantages will become apparent to those of skill in the art upon a reading of the following descriptions and a study of the several figures of the drawing.

BRIEF DESCRIPTION OF THE DRAWINGS

Several example embodiments will now be described with reference to the drawings, wherein like components are provided with like reference numerals. The example embodiments are intended to illustrate, but not to limit, the invention. The drawings include the following figures.

DETAILED DESCRIPTION OF EXAMPLE EMBODIMENTS

Figure 1:
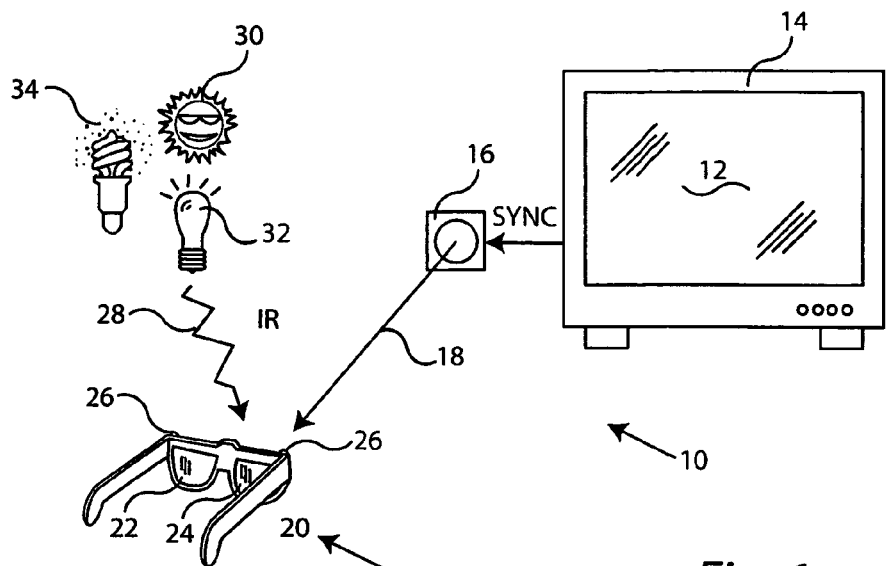
FIG. 1 is an illustration of an alternate-frame sequencing system 10 in accordance with the prior art.
Figure 2:
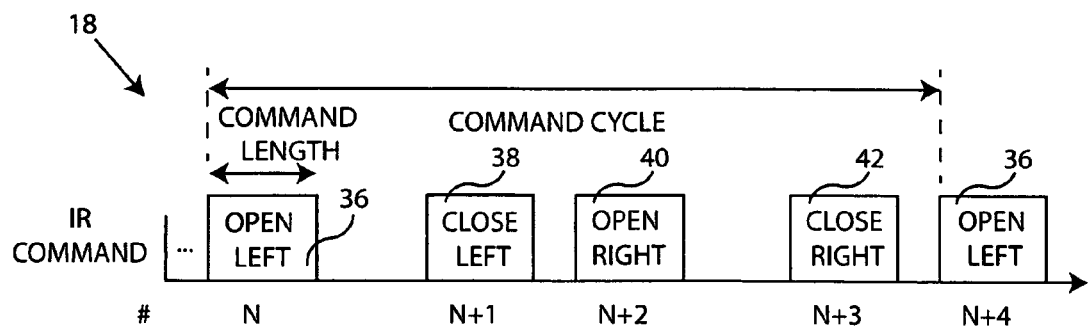
FIG. 2 is a diagram of an example I/R synchronization signal of the prior art.
Figure 3:
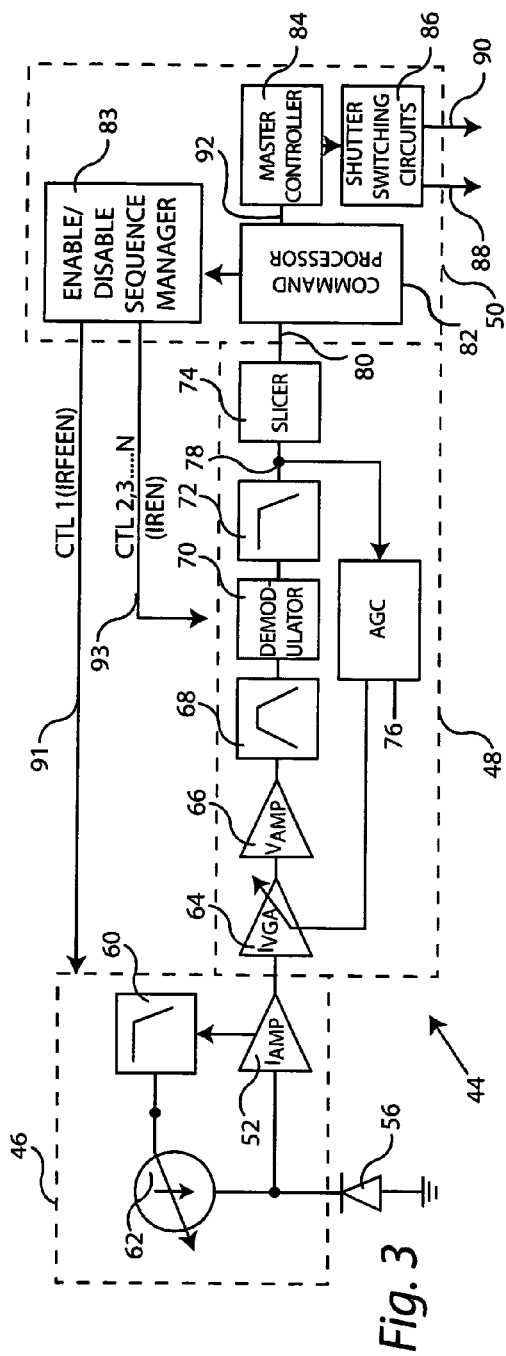
FIG. 3 is a block diagram of an example I/R receiver with duty cycling for power consumption reduction.

FIGS. 1 and 2 were described with reference to the prior art. In FIG. 3, a block diagram of a circuit 44 for 3D active eyewear, set forth by way of example and not limitation, includes a front-end circuit 46, a I/R receiver 48 and a controller 50. In example embodiments, front-end circuit 46, I/R receiver 48 and controller 50 may be a part of an a packaged integrated circuit device of the type including one or more semiconductor chips or dice, an insulating package, and a plurality of conductive leads or contacts providing electrical connections to the semiconductor chip(s).

In FIG. 3, example front-end circuit 46 includes signal path circuitry 52 and cancellation loop circuitry 54. Coupled to the front-end circuit 46 is a photodiode 56. In alternate embodiments, photodiode 56 may form a part of the front-end circuit 46. In this example, the signal path circuitry 52 is represented by a current amplifier $I_{AMP}$ and the cancellation loop circuitry 54 is represented by a low pass filter 60 and a variable current source 62.

Example I/R receiver 48 includes a variable gain current amplifier ($I_{GVA}$) 64, a voltage amplifier ($V_{AMP}$) 66, a channel filter 68, a demodulator 70 (e.g. an active rectifier to rectify command pulses), a low pass filter 72 which helps to reconstruct the width of the command pulses, an A/D converter 74 (e.g. a "slicer" including a comparator to a d.c. average reference) to digitize the output of the I/R receiver 48, and an analog automatic gain control (AGC) 76 to help extend the dynamic range of the receiver (e.g. to 100 dB). The AGC 76 operates on the peak of the analog output signal of the low pass filter 72 on a line 78 to provide an automatic gain control signal for $I_{GVA}$ 64, as will be appreciated by those of skill in the art. The A/D converter 74 converts the analog signal on line 78 to a digital signal on line 80, as will also be appreciated by those of skill in the art.

Controller 50, in this non-limiting example, includes a command processor 82, an enable/disable sequence manager 83, a master controller 84 and shutter switching circuits 86 producing a left lens control signal 88 and a right lens control signal 90. Command processor 82 receives digital output signal of the I/R receiver 48 on line 80 and decodes the signal to develop a sequence of commands on a line 92. Master controller 84 operates on the sequence of commands developed by the command processor 82 and controls the shutter switching circuits 86 (e.g. power switches) to open and close the lenses of the active eyewear in the proper sequence and with the proper timing. Enable/disable sequence manager 83 is triggered by command processor 82 to one of enable and disable various components of the I/R receiver 48 to save on battery power.

In this example embodiment, command processor 82, enable/disable sequence manager 83 and master controller 84 are illustrated as three functional blocks. This allows command processor 82, enable/disable sequence manager and master controller 84 to be implemented in different technologies. By way of non-limiting example, command processor 82 can be implemented by a state machine, enable/disable sequence manager 83 can be implemented with discrete logic, and master controller can be implemented with a microcontroller. In alternate example embodiments, the logical functions of command processor 82, enable/disable sequence manager 83 and master controller 84 can be provided in fewer or more functional blocks. By way of non-limiting example, the functions of all of these functional blocks could be performed on a single microprocessor.

The enable/disable sequence manager 83 includes a control line 91 (CTL1) which carries a signal IRFEEN (I/R Front End Enable) and a control bus 93 (CTL 2, 3 . . . N) which carries a signal IREN (I/R Enable). Control line 91 selectively enables and disables front-end circuit 46 and control bus 93 comprising a plurality of control lines that can be used to selectively enable and disable components of the I/R receiver 48 using, for example, electronic switching devices. The enable/disable sequence manager 83 is coupled to command processor 82 which, in this non-limiting embodiment, is responsible for synchronizing the start of an enable or disable performed by the enable/disable sequence manager 83 with the duty cycle of the command pulses.

Figure 4:
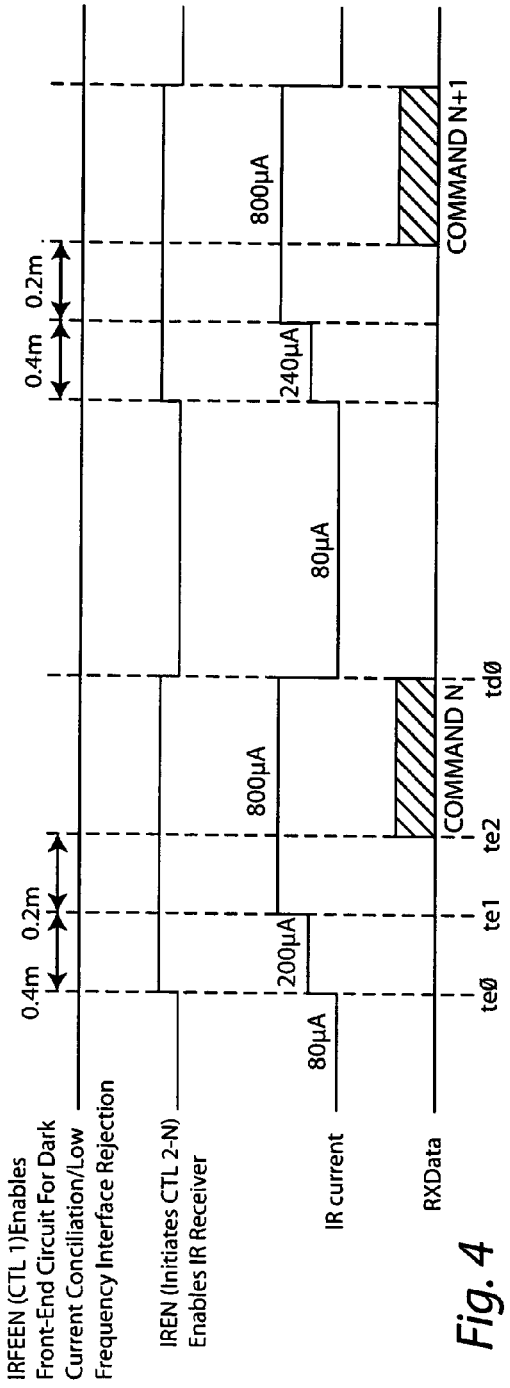
FIG. 4 is a timing diagram illustrating an operation of the example I/R receiver of FIG. 3.

FIG. 4 is an example timing diagram illustrating an operation of example I/R receiver 48. In this embodiment, the signal IRFEEN is always high ("HI" or 1) such that the front-end circuit 46 is always on. The signal IRFEEN might be low ("LO" or "0") to disable ("shut off" or "power down") the front-end circuit 46 in other operational embodiment, e.g. when the entire circuit 44 is powered down so that the battery of the 3D active eyewear can be recharged.

The plot of the RXData (e.g. the received synchronization signal) is show at the bottom of FIG. 4 to have a series of commands (Command N, Command N+1) separated by null periods. The plot just above it is the IR current, which is the current been drawn by the I/R receiver 48 (including its front-end circuit 46). The plot for the control signal IREN from the enable/disable sequence manager 83 is shown a just above the IR current plot. In this example, RXData begins LO (i.e. is in a null period), IR Current is at 80 μA (which is the minimum quiescent current drawn by the I/R receiver 48 and front-end circuit 46, and IREN is LO.

At a time $t_{e0}$, IREN goes HI to enable a first set of active components of the I/R receiver 48 having a first settling period $t_{e1}-t_{e0}$, which in this example is about 0.4 ms. During the first settlement period the IR current increases to about 250 μm, in this example. Then, at time $t_{e1}$, IREN enables a second set of active components of the I/R receiver 48 having a second settling time of $t_{e2}-t_{e1}$ which, in this example, is about 0.2 ms, and the IR current increases to 800 μA. Due to a synchronization of the IREN signal with the duty cycle of the RXData, Command N arrives at about time $t_{e2}$, as illustrated, with a fully powered-up and ready I/R receiver 48. The temporal length of Command N, which is known to the command processor 82, is $t_{d0}$–$t_{e2}$, as illustrated, and it is processed by the I/R receive during this time period. The signal IREN goes LO at $t_{d0}$, which coincides with the end of the receipt of Command N and the beginning of a null period, to selectively disable active components of the I/R receiver 48, and the IR current drops back down to its quiescent value of 80 μA, in this example.

Figure 5:
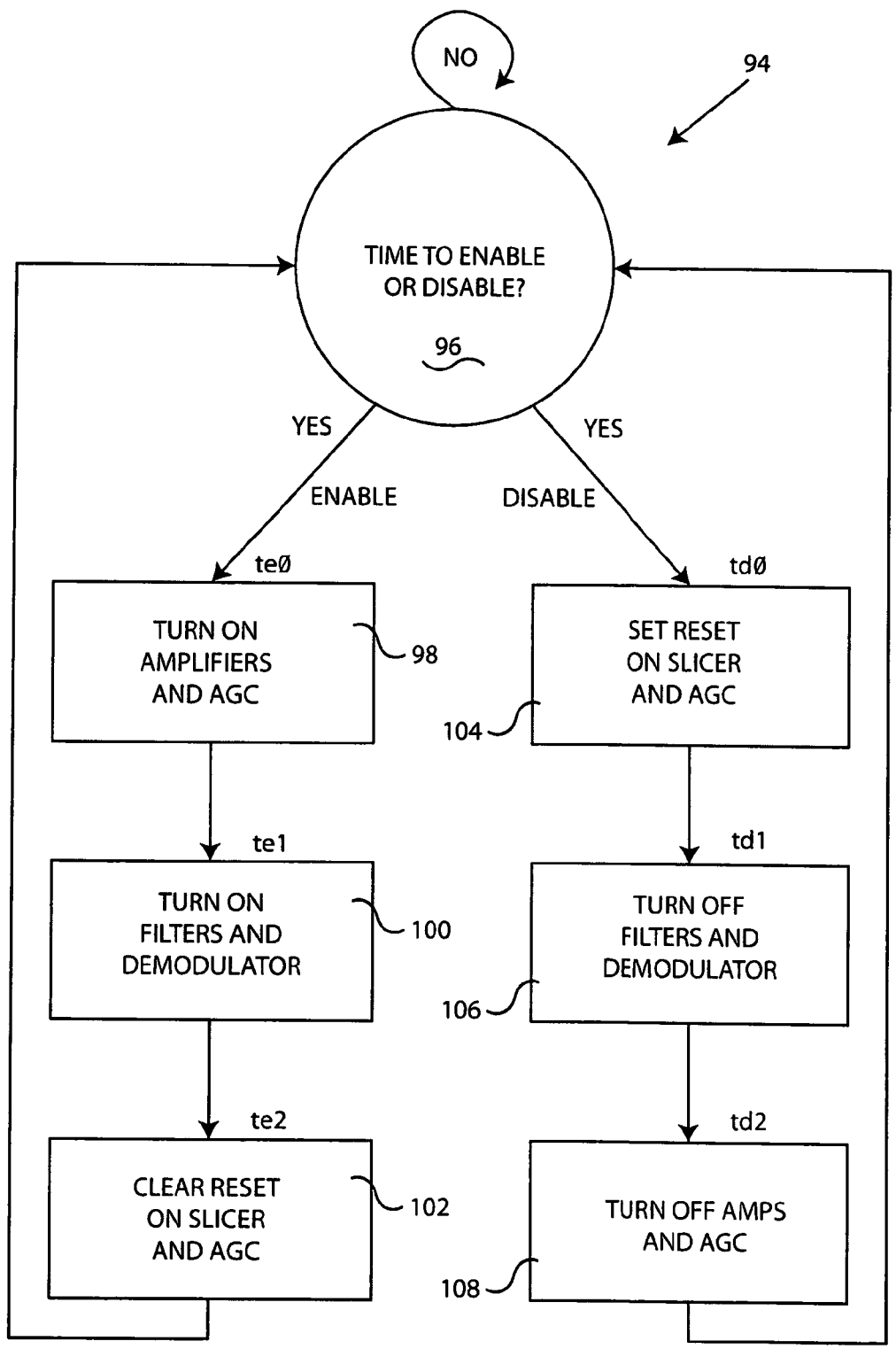
FIG. 5 is a flow diagram illustrating example enable/disable processes of the example I/R receiver of FIG. 3.

FIG. 5 is a flow diagram illustrating and example process 94 that can be implemented by enable/disable sequence manager 83. Process 94 begins in an idle state 96 wherein the enable/disable sequence manager determines if it is time to enable or disable one or more active components of the I/R receiver 48. In the present example, this decision is responsive to a command from the command processor 82, which knows the duty cycle of RXData and is responsible for synchronizing the start of the enable and disable processes with the RXData duty cycle. In the present example, the enable/disable sequence manager is essentially a timer which is set and reset by the command processor 82.

If it is determined in operation 96 that the I/R receiver 48 is to be enabled, an operation 98 turns on ("enable") the amplifiers (e.g. amplifiers 64 and 66) and the AGC 76 at time $t_{e0}$ by providing the appropriate control signal IREN on bus 93. Next, at a time $t_{e1}$, the control signal IREN on bus 93 is changed in an operation 100 to turn on ("enable") filters 68 and 72 and demodulator 70. Finally, at a time $t_{e2}$, an operation 102 changes the IREN signal to clear the resets on A/D converter ("slicer") 74 and AGC 76. At this time, the I/R receiver 48 is fully enabled ("powered-up") and is ready to receive a new command pulse and process control returns to the idle state 96.

It should be noted the enable or power-up sequence takes into account the fact that certain active components should be powered up before other active components and that different active components may have different settling or "warm-up" times. While the present example illustrates a two-stage enablement process, it will be appreciated that enablement process can include fewer or more stages.

If is it determined in operation 96 that the I/R receiver is to be disabled, an operation 104 resets the A/D converter 74 and AGC 76 at time $t_{d0}$ by producing the appropriate IREN signal on bus 93. Next, at a time $t_{d1}$, an operation 106 turns off filters 68 and 72 as well as demodulator 70 by producing the appropriate IREN signal. Finally, at a time $t_{d2}$, the amplifiers 64 and 66 and the AGC 76 are disabled, and process control returns to the idle state 96.

It should be noted that unlike the enable process exemplified by operations 98, 100 and 102, the disable process exemplified by operations 104, 106 and 108 do not need much, if any, settling time between operations. That is, $t_{d1}$–$t_{d0}$ and $t_{d2}$–$t_{d1}$ can be very small and, in some respects, $t_{d0}$, $t_{d1}$ and $t_{d2}$ can almost be considered to be concurrent.

Although various embodiments have been described using specific terms and devices, such description is for illustrative purposes only. The words used are words of description rather than of limitation. It is to be understood that changes and variations may be made by those of ordinary skill in the art without departing from the spirit or the scope of various inventions supported by the written disclosure and the drawings. In addition, it should be understood that aspects of various other embodiments may be interchanged either in whole or in part. It is therefore intended that the claims be interpreted in accordance with the true spirit and scope of the invention without limitation or estoppel.

What is claimed is:

1. An I/R receiver with duty cycle synchronized power reduction comprising:

an I/R receiver having a plurality of active components and being provided with an analog input receptive to a modulated carrier signal comprising a series of command cycles, where each command cycle includes a plurality of command pulses separated by nulls, where the ratio of the temporal length of the command pulses to the temporal length of said command cycle comprises a duty cycle of said command cycle, said I/R receiver being further provided with a serial digital output for a series of commands derived from said command pulses, wherein said active components of said T/R receiver include one or more of an amplifier, an automatic gain controller (AGC), a filter, a demodulator and an A/D converter;

a controller having a digital input coupled to said digital output of said I/R receiver and being operative to enable and disable selected active components of said I/R receiver in accordance with said duty cycle to reduce power consumption of said I/R receiver, said controller including a command processor responsive to said series of commands and being operative to determine said duty cycle from said series of commands, and an enable/disable sequence manager coupled to said command processor, wherein said command processor provides said enable/disable sequence manager with an enable/disable start signal that is synchronized with said duty cycle;

a plurality of lines coupling said enable/disable sequence manager to said I/R receiver to at least one of disable, enable, reset, and clear reset selected active components of said I/R receiver;

wherein said enable/disable sequence manager is configured to enable active components of said I/R receiver in a predetermined enable sequence;

wherein said enable/disable sequence manager is configured to enable at least one of said amplifier and said AGC before enabling at least one of said filter and said demodulator; and wherein said enable/disable sequence manager is configured to clear a reset of at least one of said A/D converter and said AGC after enabling at least one of said filters and said demodulator.

2. An I/R receiver with duty cycle synchronized power reduction as recited in claim 1 wherein said I/R receiver and said controller form a part of a packaged integrated circuit device.

3. An I/R receiver with duty cycle synchronized power reduction comprising:

an I/R receiver having a plurality of active components and being provided with an analog input receptive to a modulated carrier signal comprising a series of command cycles, where each command cycle includes a plurality of command pulses separated by nulls, where the ratio of the temporal length of the command pulses to the temporal length of said command cycle comprises a duty cycle of said command cycle, said I/R receiver being further provided with a serial digital output for a series of commands derived from said command pulses, wherein said active components of said I/R receiver include one or more of an amplifier, an automatic gain controller (AGC), a filter, a demodulator and an A/D converter;

a controller having a digital input coupled to said digital output of said I/R receiver and being operative to enable and disable selected active components of said I/R receiver in accordance with said duty cycle to reduce power consumption of said I/R receiver, said controller including a command processor responsive to said series of commands and being operative to determine said duty cycle from said series of commands, and an enable/disable sequence manager coupled to said command processor, wherein said command processor provides said enable/disable sequence manager with an enable/disable start signal that is synchronized with said duty cycle, wherein said enable/disable sequence manager is configured to disable active components of said of said I/R receiver in a predetermined disable sequence, and said enable/disable sequence manager is configured to disable at least one of said filter and said demodulator before disabling at least one of said amplifier and said AGC;

a plurality of lines coupling said enable/disable sequence manager to said I/R receiver to at least one of disable, enable, reset, and clear reset selected active components of said I/R receiver;

wherein said enable/disable sequence manager is configured to set a reset of at least one of said A/D converter and said AGC before disabling said at least one of said filter and said demodulator.

4. An I/R receiver with duty cycle synchronized power reduction as recited in claim 3 wherein said I/R receiver and said controller form a part of a packaged integrated circuit device.

5. A method for reducing power consumption in an I/R receiver system comprising:

determining a duty cycle of a series of command pulses separated by nulls; and enabling and disabling selective active components of an I/R receiver system in accordance with said duty cycler;

wherein said enabling of said active components commences during a null prior to the arrival of a new command pulse and includes first enabling a first set of active components having a first settling time, waiting for at least said first settling time, and then second enabling a second set of active components having a second settling time, and said enabling said active components commences before said arrival of said new command pulse by at least the sum of said first settling time and said second settling time.

6. A method for reducing power consumption in an I/R receiver as recited in claim 5 wherein said disabling commences after said arrival of said new command pulse.

7. A method for reducing power consumption in an I/R receiver as recited in claim 6 wherein said disabling commences concurrently with the start of a new null period after said arrival of said new command pulse.

8. A method for reducing power consumption in an I/R receiver as recited in claim 7 wherein said duty cycle is synchronized with said new command pulse.

\* \* \* \* \*